April 18, 1933. R. E. PARK, JR 1,904,876
METHOD OF MAKING ELECTRICAL CONDENSERS
Filed Nov. 24, 1930
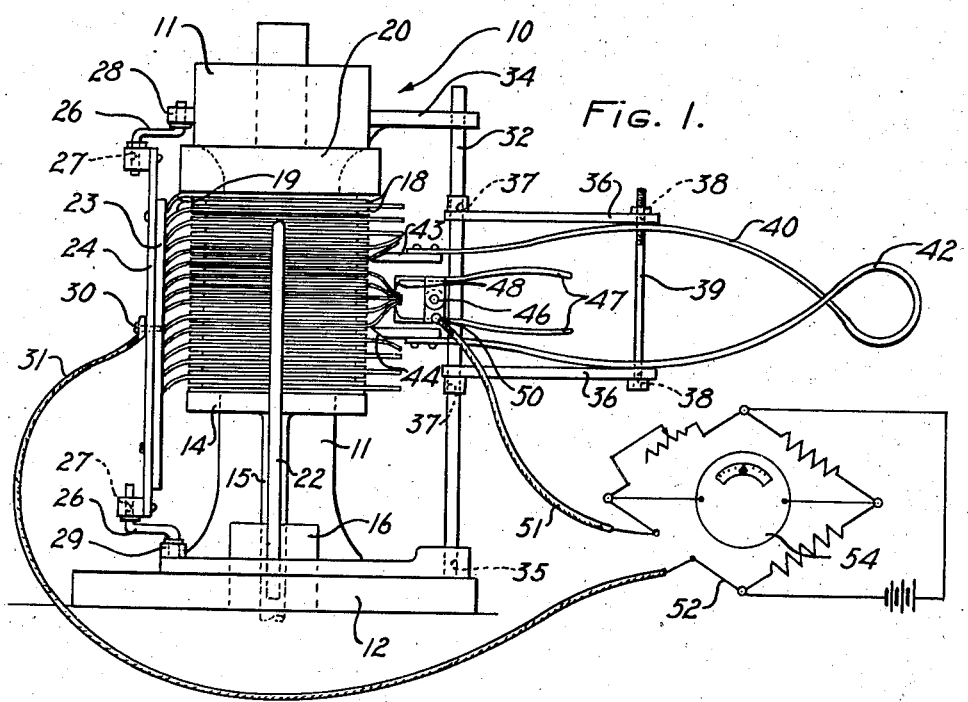
INVENTOR
R. E. PARK, JR.
BY E.R. Nowlan
ATTORNEY Patented Apr. 18, 1933

1,904,876

UNITED STATES PATENT OFFICE

ROBERT E. PARK, JR., OF JERSEY CITY, NEW JERSEY, ASSIGNOR TO WESTERN ELECTRIC COMPANY, INCORPORATED, OF NEW YORK, N. Y., A CORPORATION OF NEW YORK

METHOD OF MAKING ELECTRICAL CONDENSERS

Application filed November 24, 1930. Serial No. 497,806.

This invention relates to a method of making electrical condensers, and more particularly to a method of making electrical condensers of the laminated mica type.

An object of the invention is to provide a method of making electrical condensers which will be simple, expeditious and efficient.

A condenser is formed by subjecting a stack of condenser elements to pressure and segregating by testing a group sufficient to comprise the condenser. One embodiment of the invention includes the step of arranging mica and foil condenser elements in a vertical stack and subjecting the stack to pressure simulating the pressure with which such elements are compressed when clamped together in the ultimate commercial form of condenser. Groups of the elements, each containing a sufficient number to form a condenser of the desired capacitance, are segregated in the stack, the size of the groups being determined by testing while the stack is under pressure. When the groups have been found to contain a proper number of elements, they are rendered distinguishable by cutting the projecting conducting elements thereof at opposite corners. The groups are then removed and individually provided with stiff foils, clamp plates and screws. This assembly is then placed in an adjusting press where simulated ultimate pressure is again applied to each group. Test is then made for capacitance, and if necessary, foil adjustments to correct capacitance are made in the conventional manner after removing the pressure.

A more complete understanding of the invention will be had from the following detailed description when taken in conjunction with the accompanying drawing, wherein Fig. 1 is a schematic elevational view of a stack press;

Fig. 2 is a view taken from the right in Fig. 1 showing the method of marking the segregated groups in the stack;

Fig. 3 is a plan view of the stack shown in Fig. 2, and

Fig. 4 is a schematic elevational view of an individual adjusting press.

Referring to the drawing, wherein similar parts are indicated by identical reference numerals, a press generally designated by the numeral 10 consists of a U-shaped frame member 11 extending upwardly from a base 12. A platform 14 preferably composed of electrical insulating material is mounted upon the upper end of a vertically movable piston 15 which projects from a cylinder 16 and may comprise a portion of any conventional apparatus (not shown) for moving the platform 14 by fluid pressure. A number of insulating elements 18 composed of sheet mica and a corresponding number of conducting elements 19 preferably composed of metal foil are stacked upon the platform 14 in alternate relationship. It will be noted that in this arrangement, which is usual in building mica condensers, each sheet of mica is separated by a sheet of foil which projects from the stack at one end, the next foil strip projecting from the stack at the opposite end (Fig. 1). Also, the mica sheets are slightly wider than the foil strips so that when arranged in the stack the mica sheets project at either side thereof (Figs. 2 and 3).

The upper extremity of the frame member 11 comprises an over-hanging head 20 against which the stack of condenser elements bears when pressure is applied thereto from the bottom. A stationary guide post 22 of insulating material is secured in the base 12 on either side of the cylinder 16, the guide posts extending vertically upward and practically flush with the sides of the platform 14 in order to insure that the condenser elements are regularly arranged when stacked on the platform 14. A contacting bar 23 of any suitable electrically conductive material is secured upon an insulating retaining strip 24 which is mounted on the press to the rear of the stack by means of upper and lower curved arms 26—26. The insulating strip is pivotally secured at either end at points 27—27 to the curved arms and the latter are pivotally secured at 28 to the head 20 and at 29 to the base 12. As shown in Fig. 1, this arrangement renders it possible to swing the contacting bar 23 inwardly against those foiled strips projecting from the rear of the stack and when desired to remove the contacting bar from proximity therewith in order to permit handling of the stacked elements. The contacting bar is provided with a terminal 30 to which may be secured an electrical conductor cord 31.

At the other end a vertical mast 32 is secured to the frame member 11 by a rigid horizontal arm 34 and is engaged in an aperture 35 countersunk in the base 12. Slidably mounted on the mast 32 is a supporting framework comprising a pair of spaced parallel arms 36—36 which are apertured at 37—37 to receive the mast 32 and at 38—38 in the opposite end thereof to receive a spacing bolt 39 which may be rigidly secured therein. A U-shaped spring member 40 is pivotally mounted on the spacing bolt 39, being looped at one end 42 thereof to cause the sides thereof to tend to spring apart and thereby be engaged between the spaced arms 36. The opposite end of the arms of the U-shaped member are provided with prong portions 43 of insulating material having oppositely and externally bevelled faces 44. A clip 46 of any suitable type is positioned between the prongs 43 and may consist of a pair of pivoted arms 47—47 having at one end thereof jaws 48—48. The clip is also provided with a terminal 50 in electrical connection with the jaws 48—48 to which may be secured an electrically conductive cord 51. As viewed in Fig. 1, it will be apparent, when the contact bar 23 is in connection with the projecting foils 19 at the rear of the stack and when those foils projecting from the front of the stack are engaged between the jaws 48, and the conductors 31 and 51 respectively connected in the unknown side of any conventional testing bridge circuit 52, that a reading may be obtained on an indicator 54 of the bridge which will express the capacitance of the condenser composed of those elements with which the clip is in contact and those insulating elements included therein. Due allowance should be made, however, for the electrical effect of the usual stiff foil strips which are to be later added to the group in forming a complete condenser.

In connection with the above, it will be understood that the preliminary press shown in Fig. 1 may be designed to accommodate a large supply of the interleaved condenser elements, although as schematically disclosed material sufficient for only three condensers is shown therein. The elements are stacked on the platform in the manner described above and pressure is applied thereto by raising the platform 14, the amount of pressure being equal to the pressure with which such elements are compressed when clamped together in the ultimate form of condenser. While this pressure is maintained, the contacting bar 23 is moved to the position shown in Fig. 1 wherein it contacts with each of those conducting elements 19 projecting from the rear of the stack and the prongs 43 are advanced against the stack from the front. These prongs are usually manually controlled by an operator, who gauges the distance between the prongs by estimating the number of condenser elements which he believes should go to make up a completed condenser having the capacitance desired. The prongs are then placed against the stack and permitted to expand slightly, thus causing the bevelled faces 44 to engage those foils not desired to be included in the test and bending them out of the way. Those foils remaining between the prongs are then engaged between the jaws 48—48. The testing circuit is completed through the conductors 31 and 51 to the bridge, and by inspection the operator is enabled to decide whether or not additional or less foils need be segregated by the prongs, or whether the number of elements selected for test is satisfactory. When the test has demonstrated that the number of conducting and insulating elements included in the test is appropriate under the established pressure to form a condenser of the desired capacitance, the prongs and clips are removed and a corner is clipped from one side of the projecting foils. The spaced arms 36 are then moved downwardly on the mast 32 and the process repeated. When the test has shown that an appropriate number of elements to form a satisfactory condenser has again been selected, the conducting elements projecting from the front of the second group are clipped at the opposite corner as shown in Figs. 2 and 3. The process described is repeated until substantially all of the elements in the press are segregated into groups appropriate for use in condensers of the desired type. The contacting bar 23, prongs 43 and the clip 46 are then moved away and the stack is removed from the press and the groups separated, no difficulty being experienced by the operator in separating a particular group in toto from the stack due to the fact that successive groups are marked in opposite corners. If, in the course of selecting the desired number of elements, the group is found to contain elements which are short circuited or otherwise defective as indicated by characteristic behavior of the test set, further tests may be conducted to narrow the group under test until the defective elements are precisely located. Such elements may then be marked to distinguish them from the accepted groups and are subsequently eliminated.

A condenser is completed by placing a group in a press of the type shown in Fig. 4, which is preferably designed to accommodate individual condensers. Such a press, generally designated by the numeral 56, includes a base 57 for supporting a pair of upright members 58—58 upon which is mounted an overhanging head 59. To the under-surface of the head is secured a stationary block or anvil 60. The base 57 is apertured to receive a cylinder 62 comprising part of any convenient type of fluid pressure apparatus. A plunger 63, secured to the end of a rod 64, is provided on the upper surface thereof with a block 65 which is caused to move upwardly and downwardly with respect to the block 60 by fluid pressure. The cylinder 62 is provided with a threaded internal annular projection 81, to which is threaded a collar 80. The collar is adjustable on the projection in order to limit the travel of the plunger 63. Rigid members 72—72 project from either side of the head 59 and are each perforated to receive a vertical rod 73—73 which is rotatably mounted therein and in the base 57. An insulating member 74 is secured to each rod 73 and a contact member 75 is secured thereto. Springs 76—76 secured to each rod and the head serve to normally urge the contact members 75—75 toward the block 65.

One of the segregated groups is then provided both at the top and bottom with a pair of foil condenser strips 67, 67 which are composed preferably of brass or other conducting material stiffer than the foil used in the main body of the group. A condenser clamp, consisting of a top plate 68 and a bottom plate 69, the corners of which are perforated to receive spaced threaded connecting bolts 71, is then placed around the group in the well known manner, as shown in Fig. 4. In this connection it will be observed that the perforations of the lower plate are threaded to cooperate with the threaded extremities of the bolts 71 in order to permit adjustment of the condenser to be rendered permanent. The contact members 75—75 are then drawn back and the clamped group is placed upon the block 65 and pressure exerted to compress the group against the block 60. The contacting members 75—75 are then permitted to engage with the projecting foils of the group by the springs 76—76. Insulating blocks 78—78, secured to the piston 63, project between the contacting members 75—75 and the clamp 69 in order to prevent the foils from grounding on the clamp when the contact members are closed (Fig. 4).

A pair of conductor cords 77—77, one of which is electrically connected to each of the contact members 75, are then connected in the unknown arm of a testing circuit similar to that shown in Fig. 1, and a specified pressure is applied and a test reading is taken. The pressure is then removed to permit sufficient adjustment of the stiff outer foils 67, 67 by moving them in or out to vary an area supported against the outer sheets of mica to give approximately the capacitance desired, after which the pressure is finally varied to produce the desired capacitance exactly. It is apparent, however, that in some cases, minute adjustment of the stiff foils will be unnecessary, because the desired capacitance may be obtained directly by varying the pressure. While the final pressure is maintained, the clamp is tightened upon the group by turning the bolts 71 until it is found that releasing the pressure of the block 65 ceases to alter the capacitance of the condenser as expressed by the bridge. The condenser is then ready for commercial use and may be withdrawn from the press.

It will be observed that by applying the pressure and tightening the screws in the above manner, equal screw pressure on the condenser body is obtained on all corners. It is of course obvious that various changes and modifications may be made to the details of construction and the steps of the method of making condensers above described without departing from the spirit of this invention as set forth in the appended claims.

What is claimed is:

1. A method of making condensers which includes subjecting a plurality of condenser elements to a pressure, and simultaneously segregating by testing a group of some of the elements to comprise a condenser.

2. A method of making condensers which includes subjecting a plurality of condenser elements to pressure, and simultaneously segregating by test and designation groups of the elements to comprise condensers having similar characteristics.

3. A method of making condensers which includes assembling a plurality of condenser elements, subjecting them to a predetermined pressure to control the capacitance of the assembly, and segregating a portion of the assembly by testing while under pressure.

4. A method of making condensers which includes assembling a plurality of condenser elements, subjecting them to a predetermined pressure, selecting portions of the assembly by testing while under pressure, and designating the selected portions to render them distinguishable in the assembly.

5. A method of making condensers which includes stacking a plurality of condenser elements, subjecting them to a predetermined pressure, segregating a portion of the stack by testing while under pressure, and arranging the elements of the portion together with the predetermined pressure to form a condenser.

6. In a method of making condensers, arranging a plurality of conducting and insulating elements in alternate relationship, subjecting them to a predetermined pressure and simultaneously segregating a portion of them by testing while under pressure.

7. In a method of making condensers, stacking a plurality of conducting and insulating elements in alternate relationship, subjecting them to a predetermined pressure equivalent to the pressure to which such elements are subjected in the completed condenser, and segregating a portion of the stack by testing for capacitance while under the predetermined pressure.

8. A method of making condensers which includes stacking a plurality of insulating elements and foil conducting elements in alternate relationship, subjecting them to a predetermined pressure, segregating a portion of the stack by testing for capacitance while under said pressure, pressing the elements of the portion together with a stiff foil element under the predetermined pressure and testing, relieving the pressure, adjusting the position of the stiff element with respect to the condenser, restoring the predetermined pressure to produce approximately the desired capacitance, and then varying the pressure to obtain exact capacitance.

9. A method of making condensers which includes subjecting a plurality of condenser elements to a pressure corresponding to the pressure to which some of said elements are subjected in the completed condenser, and segregating elements into groups by testing while under the desired pressure.

10. A method of making condensers which includes a preliminary step of subjecting a plurality of condenser elements to a pressure corresponding to the pressure to which said elements are subjected in the completed condenser, segregating some of the elements into a group by testing under the desired pressure, and then making a condenser of the group.

11. A method of making condensers which includes a preliminary step of subjecting a plurality of condensers to a pressure corresponding to the pressure to which such elements are subjected in the completed condenser, segregating some of the elements into groups by testing while under the desired pressure, and then making a plurality of condensers from said groups.

In witness whereof, I hereunto subscribe my name this 7th day of November, A. D. 1930.

ROBERT E. PARK, Jr.